N. H. LINDLEY.
Horse Hoe.
No. 98,983.
Patented Jan. 18, 1870.
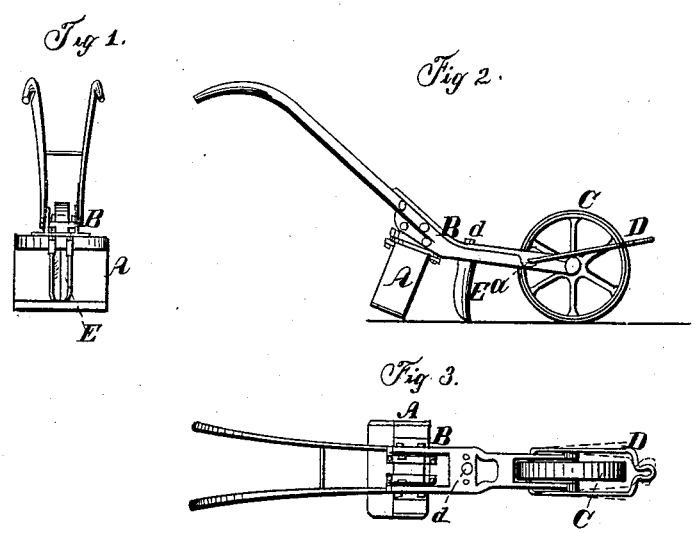

UNITED STATES PATENT OFFICE.

N. H. LINDLEY, OF BRIDGEPORT, CONNECTICUT.

IMPROVEMENT IN HORSE-HOES.

Specification forming part of Letters Patent No. 98,983, dated January 18, 1870.

*To all whom it may concern:*

Be it known that I, N. H. LINDLEY, of Bridgeport, in the county of Fairfield and State of Connecticut, have invented a new Improvement in Horse-Hoes; and I do hereby declare the following, when taken in connection with the accompanying drawings and the letters of reference marked thereon, to be a full, clear, and exact description of the same, and which said drawings constitute part of this specification, and represent, in—

Figure 1, a rear view; Fig. 2, a side view, and in Fig. 3 a top view.

This invention relates to an improvement in the patent granted to me dated February 9, 1869, for horse-hoe.

In the use of my hoe, patented as aforesaid, it is found difficult to turn the hoe without tipping one way or the other, which would throw one side of the hoe out of the ground, and this difficulty is occasioned from the fact that the horse draws directly in front, and this difficulty is experienced in other cultivators as well as my own. It is also found desirable to combine with my hoe an adjustable tooth which will plow a small furrow in advance of the hoe.

My invention therefore consists, first, in arranging in a cultivator a bail or yoke by which the horse draws, the said yoke being attached to the cultivator by slots, so that in turning to the right or left the attachment will move in the said slots, and therefore permit the bail to swing to the right or left, leaving the movement of the hoe free in the hands of the operator to be turned without tipping; also, in combining with an adjustable hoe a tooth made adjustable relatively to the path of the hoe.

A is the hoe, formed from sheet metal, so as to make two or more sides, (by preference four,) and arranged in the frame or beam B so as to be adjustable to the right or left or to different inclinations, as fully shown in my patent before referred to.

To the beam and back of the wheel C, I attach a yoke or bail, D, the ends of the yoke turned into slots, as at $a$, Fig. 2, so that drawing directly forward the yoke bears against the forward end of the slot upon both sides; but turning to the right or left the yoke swings, as denoted in broken lines, Fig. 3, one side working back into its slot to permit such movement of the yoke. Therefore, as the horse turns in drawing the hoe, the holder of the hoe may turn gradually and without tipping the hoe, which he cannot do when the play of the yoke is not arranged for, and this part of my invention is applicable to other cultivators.

E is a tooth, not unlike common cultivator-teeth, and is arranged in front of the hoe A, and secured to the beam by a nut, $d$, or similar device, and is made adjustable to the right or left by other holes, through which the shank of the tooth may be set, or by a transverse slot across the beam.

I claim as my invention—

1. The yoke D, attached to the beam upon opposite sides, and arranged in slots so as to swing to the right or left, for the purpose and in the manner described.

2. In combination with the hoe A, the adjustable tooth E, as and for the purpose specified.

N. H. LINDLEY.

Witnesses:
C. M. MINOR,
L. M. SLADE.